Patented May 5, 1953

2,637,747

UNITED STATES PATENT OFFICE 2,637,747

FLUORINATION

Earl T. McBee, West Lafayette, Ind., assignor to Purdue Research Foundation, West Lafayette, Ind., a corporation of Indiana No Drawing. Application January 23, 1948, Serial No. 4,072

14 Claims. (Cl. 260—653)

This invention relates to fluorination and more particularly to fluorination of unsaturated aliphatic compounds.

This application is a continuation-in-part of my copending application, Serial No. 497,875, filed August 7, 1943, now abandoned.

Among the objects of this invention are the provision of methods for fluorinating unsaturated haloaliphatic compounds to produce particular fluorinated products; and the provision of methods for fluorinating unsaturated haloaliphatic compounds that may be easily carried out to form valuable products.

The invention accordingly comprises the steps and sequence of steps, and features of synthesis, analysis, or metathesis, which will be exemplified in the processes hereinafter described, and the scope of the application of which will be indicated in the following claims.

It has been found in accordance with the present invention that haloaliphatic compounds having at least one terminal carbon atom containing only halogen substituents, which carbon atom is bonded to an adjacent carbon atom by an unsaturated linkage will react with hydrogen fluoride to form fluorinated aliphatic compounds having three fluorine atoms on at least one terminal carbon atom. The reaction is not merely an addition reaction or a substitution reaction, but rather an addition and substitution reaction in which fluorine will add to an unsaturated carbon atom as well as replace other halogen substituents on that carbon atom. The replaced or substituted halogens may all be the same or may be different. It has also been found in accordance with the present invention that the use of antimony pentachloride will serve to improve the yield in these reactions.

The following examples are merely illustrative:

Example 1

One mole of 1,1-dichloroethylene was placed in a nickel-lined autoclave and six moles of anhydrous hydrogen fluoride added. The bomb was heated to 200° C. for fourteen hours. A pressure of about 4000–5000 pounds per square inch developed. The contents were then bled hot through a sodium hydroxide solution into a cold trap. The product was then rectified in a low temperature column. 1,1,1-Trifluoroethane and 1-chloro-1,1-difluoroethane were obtained.

Example 2

One mole of 1,1-dichloroethylene was placed in a nickel-lined autoclave cooled in ice, and five moles of hydrogen fluoride were added. The autoclave was sealed and heated to 140° C. for fourteen hours, during which time a gauge pressure of 1200 pounds per square inch was attained. The contents were then bled hot through an aqueous sodium hydroxide solution, dried, and condensed in a Dry Ice trap. Rectification gave 1,1,1 - trifluoroethane, boiling point —46.7° C., 1-chloro-1,1-difluoroethane, boiling point —9.6° C., and 1,1-dichloro-1-fluoroethane, boiling point 31.7–31.8° C.

Example 3

Four and one-half moles (590 grams) of commercial trichloroethylene ($CHCl=CCl_2$) and 0.17 moles (50 grams) of antimony pentachloride were mixed in a Monel autoclave having a capacity of 1.5 liters. This autoclave had previously been cold tested at 11,000 pounds per square inch hydrostatic pressure. After putting on the removable head and securing in position within a shelter of one-half inch armor plate, twenty-two moles (440 grams) of hydrogen fluoride were added from a small weighed cylinder. After addition of hydrogen fluoride was complete, the autoclave was sealed and heated to 170–192° C., for sixteen hours. The autoclave and its contents were cooled to 90° C., and then the gaseous products discharged into aqueous sodium hydroxide. The scrubbing solution contained a quantity of sodium hydroxide equivalent to the quantity of hydrogen fluoride charged. Material which did not react with the sodium hydroxide and which did not condense in the scrubber passed through a drying tower and was collected in receivers cooled by a Dry Ice trichloroethylene mixture. The residue which remained in the autoclave and that which collected in the scrubber was steam distilled, dried and rectified. A 32% yield of 2-chloro-1,1,1-trifluoroethane was obtained. 1,2-dichloro-1,1-difluoroethylene was also obtained.

Example 4

Three moles (393 grams) of trichloroethylene was poured into the autoclave described in Example 3. After sealing and mounting in position, twenty moles (400 grams) of hydrogen fluoride was added. When addition of the hydrogen fluoride was complete, the autoclave was sealed and heated to 217–228° C. At the end of a reaction period of thirty-six hours the autoclave and its contents were cooled to 100° C. and the gaseous products discharged as described in Example 3. Upon rectification there were obtained, 2 - chloro - 1,1,1 - trifluoroethane, 1,2 - dichloro-1,1-difluorothane, and trichloroethylene.

Example 5

Three and one-half moles (732 grams) of 1,1,2-trichloro - 3,3,3 - trifluoropropene and 0.69 mole (200 grams) of antimony pentachloride were mixed in a two-liter nickel-lined autoclave similar to the Monel autoclave described in Example 3. This autoclave was mounted so that agitation of the reaction mixture could be provided by rocking and twenty-three moles (460 grams) of hydrogen fluoride added. After addition of hydrogen fluoride was complete, the autoclave was sealed and heated, with rocking to 205° C. during four hours and maintained at that temperature for an additional seventeen hours. After cooling to 75–100° C. the gaseous products were discharged into a recovery train similar to that described in Example 3. The products were collected and analyzed in a manner similar to that described previously. The conversion to 2-chloro-1,1,1,3,3,3-hexafluoropropane (B. P. 15.5–16.1° C.) was 65%.

Example 6

The procedure of Example 1 was repeated except 1-bromo-1-diodoethylene was used as the starting reactant in place of 1,1-dichloroethylene. Comparable results were obtained, the products including 1,1,1-trifluorethane.

Example 7

The procedure of Example 2 was repeated except 1,1-diiodoethylene was used as a starting reactant in place of 1,1-dichloroethylene. Rectification gave among other products 1,1,1-trifluoroethane.

Example 8

The procedure of Example 3 was repeated except 2-chloro-1-bromo-1-iodoethylene

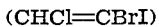
(CHCl=CBrI)

was utilized as a starting reactant in place of commercial trichloroethylene. Comparable results were obtained, the products of this reaction including 2-chloro-1,1,1-trifluoroethane.

Example 9

The procedure of Example 4 was repeated except 2-chloro-1,1-dibromoethylene was used as a starting reactant in place of trichloroethylene. Comparable results were obtained, the products of this reaction including 2-chloro-1,1,1-trifluoroethane.

It is to be understood that the processes of the present invention are not alone applicable to the trifluorination of a single terminal carbon atom but are effective to fluorinate additional terminal carbon atoms of the starting reactant.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

I claim:

1. The method of preparing fluorinated saturated aliphatic compounds with three fluorine atoms on at least one terminal carbon atom which consists of reacting hydrogen fluoride with a haloalkene having not more than three carbon atoms and having at least one terminal carbon atom containing only halogen substituents and which carbon atom is bonded to the adjacent carbon atom by an unsaturated linkage, and continuing the reaction until the halogen substituents on said carbon atom are all replaced with fluorine.

2. The method of preparing fluorinated saturated aliphatic compounds with three fluorine atoms on at least one terminal carbon atom which consists of reacting hydrogen fluoride with a haloalkene having not more than three carbon atoms and having at least one terminal carbon atom containing only unlike halogen substituents and which carbon atom is bonded to the adjacent carbon atom by an unsaturated linkage, and continuing the reaction until the halogen substituents on said carbon atom are all replaced with fluorine.

3. The method of preparing fluorinated saturated aliphatic compounds with three fluorine atoms on at least one terminal carbon atom which comprises reacting hydrogen fluoride in the presence of antimony pentachloride with a haloalkene having not more than three carbon atoms and having at least one terminal carbon atom containing only halogen susbtituents and which carbon atom is bonded to the adjacent carbon atom by an unsaturated linkage, the molar quantity of haloalkene exceeding the molar quantity of antimony pentachloride, and continuing the reaction until the halogen substituents on said carbon atom are all replaced with fluorine.

4. The method of preparing fluorinated saturated aliphatic compounds with three fluorine atoms on at least one terminal carbon atom which comprises reacting hydrogen fluoride in the presence of antimony pentachloride with a haloalkene having not more than three carbon atoms and having at least one terminal carbon atom containing only unlike halogen substituents and which carbon atom is bonded to the adjacent carbon atom by an unsaturated linkage, the molar quantity of haloalkene exceeding the molar quantity of antimony pentachloride, and continuing the reaction until the halogen substituents on said carbon atom are all replaced with fluorine.

5. The method of preparing 1,1,1-trifluorethane consisting of reacting anhydrous hydrogen fluoride with 1,1-dichloroethylene, and continuing the reaction until the chlorine atoms are replaced with fluorine.

6. The method of preparing 1,1,1-trifluoroethane comprising reacting hydrogen fluoride with 1,1-dichloroethylene in the presence of antimony pentachloride, the molar quantity of haloalkene exceeding the molar quantity of antimony pentachloride, and continuing the reaction until the chlorine atoms are replaced with fluorine.

7. The method of preparing 2-chloro-1,1,1-trifluoroethane consisting of reacting hydrogen fluoride with trichloroethylene, and continuing the reaction until the chlorine atoms on the carbon atoms containing only chlorine substituents are replaced with fluorine.

8. The method of preparing 2-chloro-1,1,1-trifluoroethane comprising reacting hydrogen fluoride with trichloroethylene in the presence of antimony pentachloride, the molar quantity of haloalkene exceeding the molar quantity of antimony pentachloride, and continuing the reaction until the chloride atoms on the carbon atom containing only chloride substituents are replaced with fluorine.

9. The method of preparing 2-chloro-1,1,1,3,3,-3-hexafluoropropane consisting of reacting hydrogen fluoride with 1,1,2-trichloro-3,3,3-trifluoropropene, and continuing the reaction until the chlorine atoms on the carbon atom containing only chlorine substituents are replaced with fluorine.

10. The method of preparing 2-chloro-1,1,1,-3,3,3-hexafluoropropane comprising reacting hydrogen fluoride with 1,1,2-trichloro-3,3,3-trifluoropropene in the presence of antimony pentachloride, the molar quantity of haloalkene exceeding the molar quantity of antimony pentachloride, and continuing the reaction until the chlorine atoms on the carbon atom containing only chloride substituents are replaced with fluorine.

11. The method of preparing 2-chloro-1,1,1-trifluoroethane consisting of reacting hydrogen fluoride with 2-chloro-1-bromo-1-iodoethylene, and continuing the reaction until the halogen atoms on the carbon atom containing only halogen substituents are replaced with fluorine.

12. The method of preparing 1,1,1-trifluoroethane comprising reacting hydrogen fluoride with 2-chloro-1-bromo-1-iodoethylene in the presence of antimony pentachloride, the molar quantity of haloalkene exceeding the molar quantity of antimony pentachloride, and continuing the reaction until the halogen atoms on the carbon atom containing only halogen substituents are replaced with fluorine.

13. The method of preparing 2-chloro-1,1,1-trifluoroethane consisting of reacting hydrogen fluoride with 2-chloro-1,1-dibromoethylene, and continuing the reaction until the bromine atoms are replaced with fluorine.

14. The method of preparing 2-chloro-1,1,1-trifluoroethane comprising reacting hydrogen fluoride with 2-chloro-1,1-dibromoethylene in the presence of antimony pentachloride, the molar quantity of haloalkene exceeding the molar quantity of antimony pentachloride, and continuing the reaction until the bromine atoms are replaced with fluorine.

EARL T. McBEE.

References Cited in the file of this patent

UNITED STATES PATENTS

| Number | Name | Date |
|---|---|---|
| 2,005,710 | Daudt et al. | June 18, 1935 |
| 2,062,743 | Daudt et al. | Dec. 1, 1936 |
| 2,146,354 | Scherer | Feb. 7, 1939 |
| 2,436,357 | Gochenour | Feb. 17, 1948 |
| 2,437,993 | Benning et al. | Mar. 16, 1948 |
| 2,446,124 | Boyd | July 27, 1948 |
| 2,466,189 | Waalkes | Apr. 5, 1949 |
| 2,469,848 | Salisbury | May 10, 1949 |